(12) United States Patent
Nishikawa

(10) Patent No.: US 10,647,217 B2
(45) Date of Patent: May 12, 2020

(54) CHARGING APPARATUS

(71) Applicant: HONDA MOTOR CO., LTD., Minato-ku, Tokyo (JP)

(72) Inventor: Shosei Nishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/171,425

(22) Filed: Oct. 26, 2018

(65) Prior Publication Data
US 2019/0152326 A1    May 23, 2019

(30) Foreign Application Priority Data

Nov. 21, 2017 (JP) ................................. 2017-223549

(51) Int. Cl.
| | |
|---|---|
| H02J 7/00 | (2006.01) |
| B60L 53/36 | (2019.01) |
| B65G 37/00 | (2006.01) |
| B65G 39/10 | (2006.01) |
| B64F 1/22 | (2006.01) |
| B64F 1/36 | (2017.01) |
| B60L 53/12 | (2019.01) |
| B60L 53/38 | (2019.01) |

(52) U.S. Cl.
CPC ............... *B60L 53/36* (2019.02); *B60L 53/12* (2019.02); *B60L 53/38* (2019.02); *B64F 1/22* (2013.01); *B64F 1/362* (2013.01); *B65G 37/00* (2013.01); *B65G 39/10* (2013.01); *B60L 2200/10* (2013.01); *B60L 2230/16* (2013.01)

(58) Field of Classification Search
CPC .................................. B60L 53/36; B60L 53/12
USPC .......................................................... 320/109
See application file for complete search history.

(56) References Cited

U.S. PATENT DOCUMENTS

| | | | |
|---|---|---|---|
| 9,764,836 B1 * | 9/2017 | Elzinga | B64C 39/024 |
| 10,124,912 B2 * | 11/2018 | Walsh | B64F 1/32 |
| 2014/0124621 A1 * | 5/2014 | Godzdanker | B64F 1/125 244/110 E |
| 2016/0039541 A1 * | 2/2016 | Beardsley | G05D 1/0088 701/2 |
| 2018/0229859 A1 * | 8/2018 | Evans | B64F 1/36 |
| 2018/0290554 A1 * | 10/2018 | Sharma | B64C 39/024 |
| 2019/0193952 A1 * | 6/2019 | Zevenbergen | B65G 47/91 |

FOREIGN PATENT DOCUMENTS

| | | |
|---|---|---|
| JP | 6156605 | 7/2017 |
| WO | 2016143806 | 9/2016 |

* cited by examiner

*Primary Examiner* — Suchin Parihar
(74) *Attorney, Agent, or Firm* — Amin, Turocy & Watson, LLP

(57) ABSTRACT

A charging apparatus includes a charging section configured to perform charging on a drone (unmanned aerial vehicle) and a conveyor group arranged around the charging section. The conveyor group are arranged at positions adjacent to the charging section and include a first conveyor section placed at a position adjacent to the charging section and configured to move the drone in a first direction toward the charging section, and a second conveyor section placed at a position adjacent to the first conveyor section and configured to move the drone in a second direction perpendicular to the first direction.

12 Claims, 8 Drawing Sheets

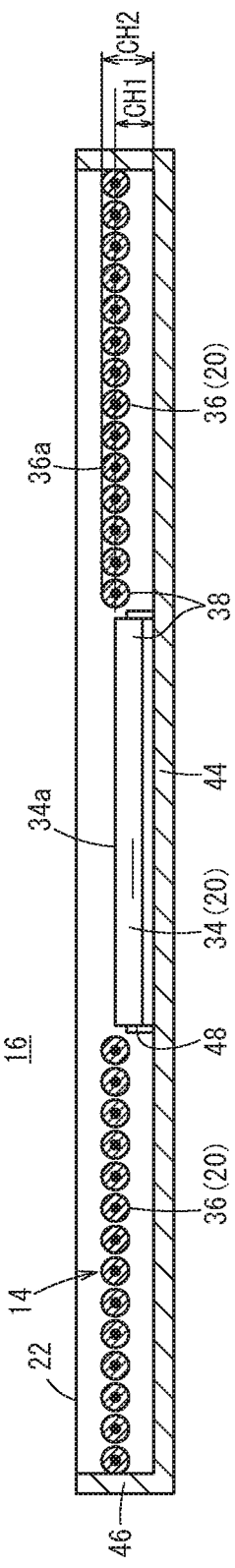
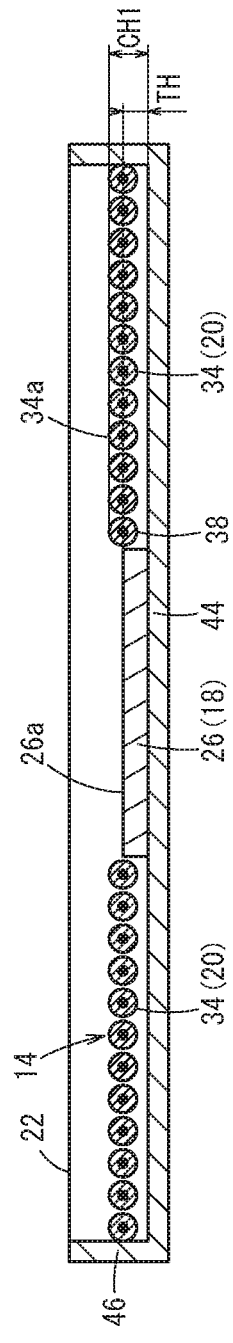
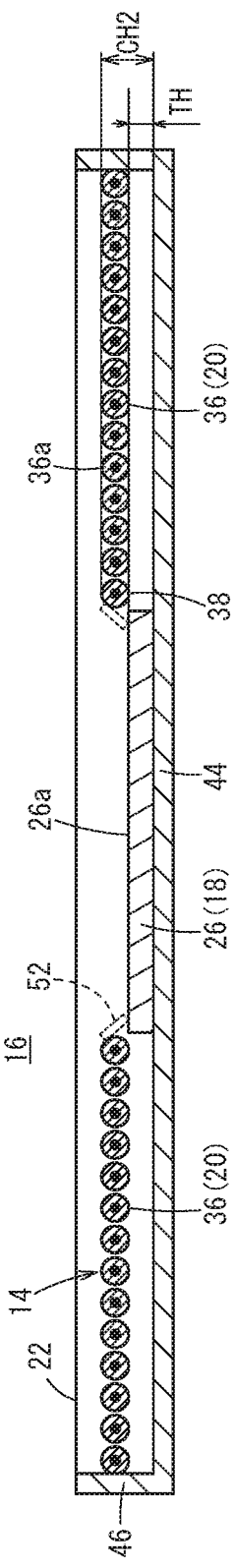
FIG. 2A
FIG. 2B
FIG. 2C

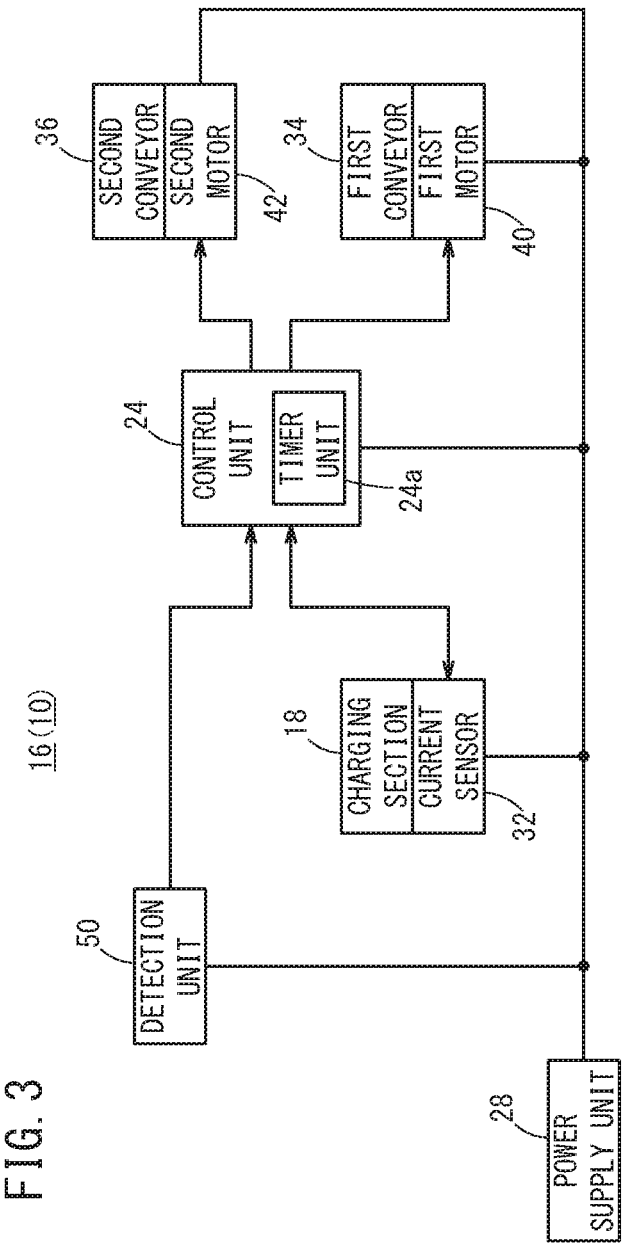

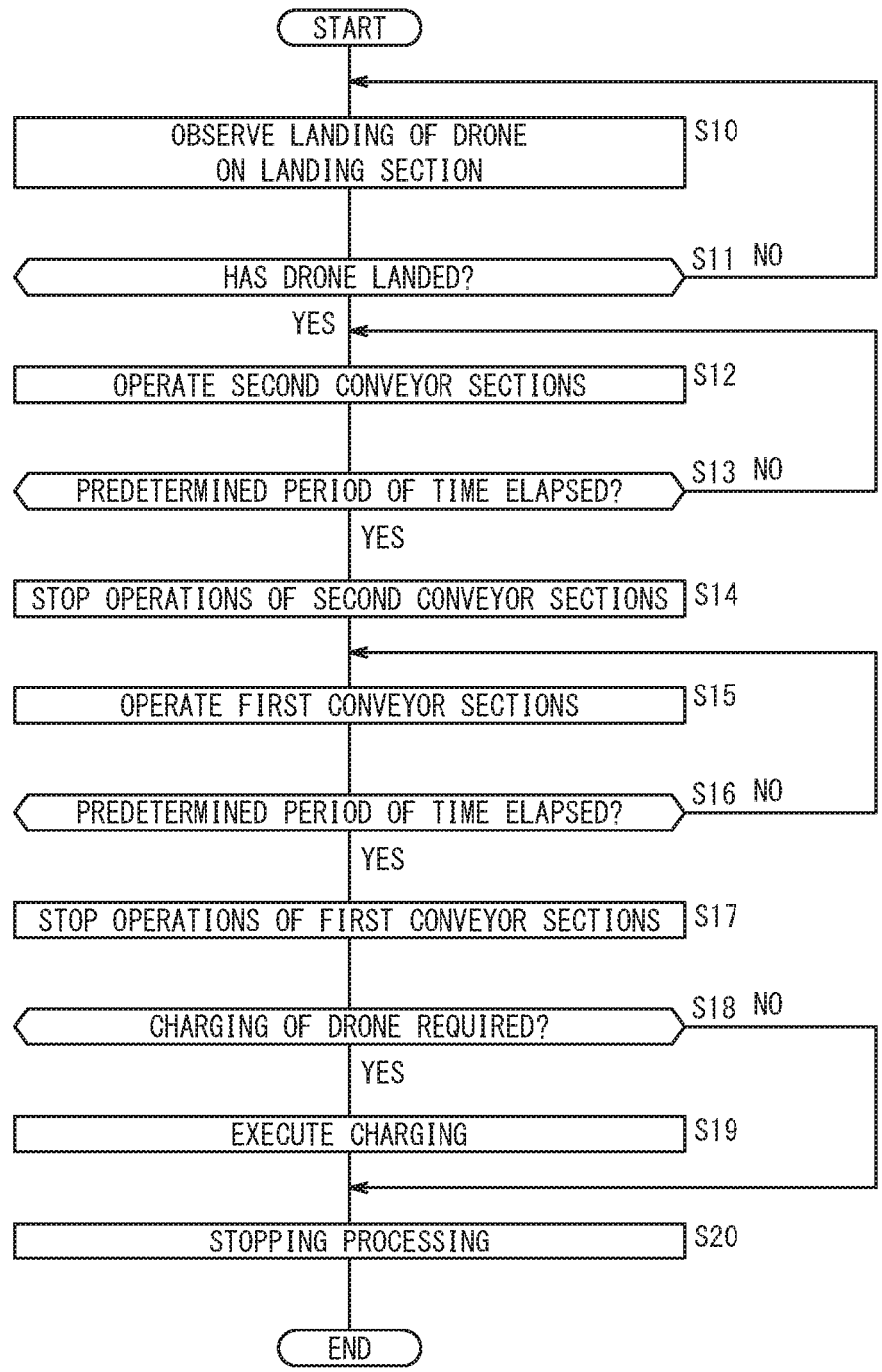

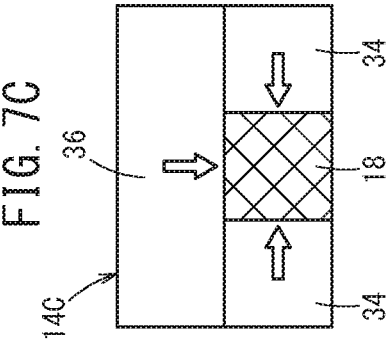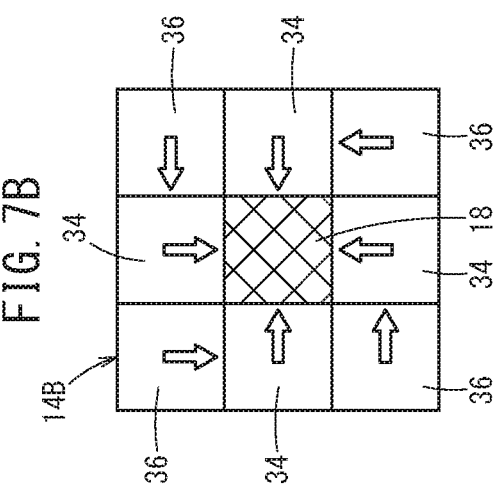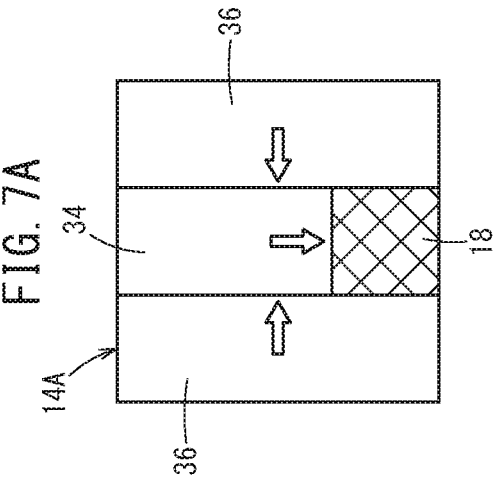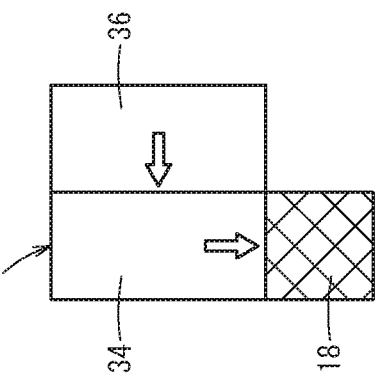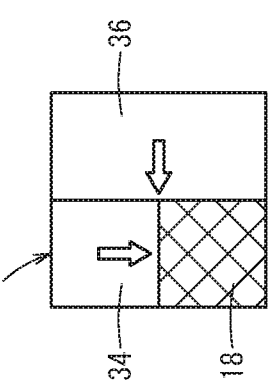

CHARGING APPARATUS

CROSS-REFERENCE TO RELATED APPLICATION

This application is based upon and claims the benefit of priority from Japanese Patent Application No. 2017-223549 filed on Nov. 21, 2017, the contents of which are incorporated herein by reference.

BACKGROUND OF THE INVENTION

Field of the Invention

The present invention relates to a charging apparatus capable of charging an unmanned aerial vehicle.

Description of the Related Art

An unmanned aerial vehicle (so-called drone) is set (connected) to, for example, a charging apparatus after an operation such as flight or the like, so that a battery inside is charged by the charging apparatus. In particular, if the charging apparatus is able to perform charging immediately after the landing of the unmanned aerial vehicle, the unmanned aerial vehicle can easily be operated again. However, because the unmanned aerial vehicle is involved in a problem that the landing accuracy is low due to factors including the influence of disturbances such as wind or the like, deterioration in communication accuracy, operational errors and the like, the unmanned aerial vehicle cannot always land reliably in an area where the unmanned aerial vehicle can be charged by (connected to) the charging apparatus.

For this reason, a charging apparatus disclosed in International Publication No. WO 2016/143806, for example, includes movable rod members provided on four sides on a heliport, and the four rod members are moved from outside toward a center portion of the heliport to push leg portions of an unmanned aerial vehicle landed on the heliport. Then, after moving the unmanned aerial vehicle to the center portion of the heliport, the charging apparatus performs charging from a pair of electrode terminals of the rod members putting the leg portions therebetween, to the electrode terminals at the leg portions of the unmanned aerial vehicle.

SUMMARY OF THE INVENTION

However, the charging apparatus disclosed in International Publication No. WO 2016/143806 involves inconveniences that, when pushing the unmanned aerial vehicle, the rod members may bring it down or may fail to guide it to an intended attitude, and so on. Further, in dependence on the landing orientation of the unmanned aerial vehicle, there is a possibility that the electrode terminals of the charging apparatus do not face the electrode terminals of the unmanned aerial vehicle (that is, cannot charge them) even when the rod members put the unmanned aerial vehicle therebetween after moving the same to the center portion.

The present invention has been made taking the aforementioned circumstances into consideration, and it is an object of the present invention to provide a charging apparatus capable of charging an unmanned aerial vehicle further reliably in a simple configuration even where the landing accuracy of the unmanned aerial vehicle is low, and at the same time, capable of reducing manufacturing costs.

In order to accomplish the aforementioned object, a charging apparatus according to the present invention includes a charging section configured to perform charging on an unmanned aerial vehicle, a first conveyor section disposed at a position adjacent to the charging section and configured to move the unmanned aerial vehicle in a first direction toward the charging section, and a second conveyor section disposed at a position adjacent to the first conveyor section and configured to move the unmanned aerial vehicle in a second direction perpendicular to the first direction.

Further, it is preferable that the second conveyor section be disposed at the position adjacent to the charging section together with the first conveyor section, and be configured to be able to move the unmanned aerial vehicle directly to the charging section through a movement in the second direction.

Furthermore, the first conveyor section may include a pair of the first conveyor sections disposed with the charging section interposed therebetween, and the second conveyor section may include a pair of the second conveyor sections with the charging section and the first conveyor sections interposed therebetween.

Then, it is preferable that the charging section be provided at a lower position than the first conveyor section.

Further, the first conveyor section may be provided at a lower position than the second conveyor section.

Furthermore, the charging section may be provided at a lower position than the second conveyor section.

Here, it is preferable that the charging apparatus further include a detection unit configured to detect landing of the unmanned aerial vehicle on the first and second conveyor sections, and a control unit configured to control operations of the first and second conveyor sections based on detection of the unmanned aerial vehicle by the detection unit.

In addition to this, the control unit may be configured to stop the operation of one of the first and second conveyor sections while operating the other of the first and second conveyor sections.

Still furthermore, the control unit may be configured to make a moving speed of the first conveyor section differ from a moving speed of the second conveyor section.

Yet furthermore, at least one of the first and second conveyor sections may include a notification section configured to notify the unmanned aerial vehicle of position information of the charging apparatus.

According to the present invention, because the charging apparatus has the first and second conveyor sections in addition to the charging section, it is possible to enlarge the area of the landing section for the unmanned aerial vehicle to land on the charging apparatus, and it is possible to variously form the planar shape of the landing section. This makes it possible to easily land the unmanned aerial vehicle even when its landing accuracy is low. Then, the charging apparatus is able to reliably lead the unmanned aerial vehicle to the charging section by conveying the unmanned aerial vehicle landed on the second conveyor section in the second direction and conveying the unmanned aerial vehicle conveyed to or landed on the first conveyor section in the first direction. In addition, the first and second conveyor sections can be installed at a low cost, reducing manufacturing costs.

The above and other objects, features, and advantages of the present invention will become more apparent from the following description when taken in conjunction with the accompanying drawings, in which a preferred embodiment of the present invention is shown by way of an illustrative example.

BRIEF DESCRIPTION OF THE DRAWINGS

FIG. 2A is a sectional view taken along the line IIA-IIA in FIG. 1;

FIG. 2B is a sectional view taken along the line IIB-IIB in FIG. 1;

FIG. 2C is a sectional view taken along the line IIC-IIC in FIG. 1;

FIG. 3 is a block diagram showing a configuration of the charging apparatus;

FIG. 5 is a flowchart showing the operation of the charging apparatus at the time of charging;

FIGS. 7A to 7E are plan views illustrating the configurations of landing sections according to first to fifth modifications of the present invention.

DESCRIPTION OF THE PREFERRED EMBODIMENTS

Hereinafter, with reference to the accompanying drawings, the present invention will be described in detail based on a preferred embodiment.

Figure 1:
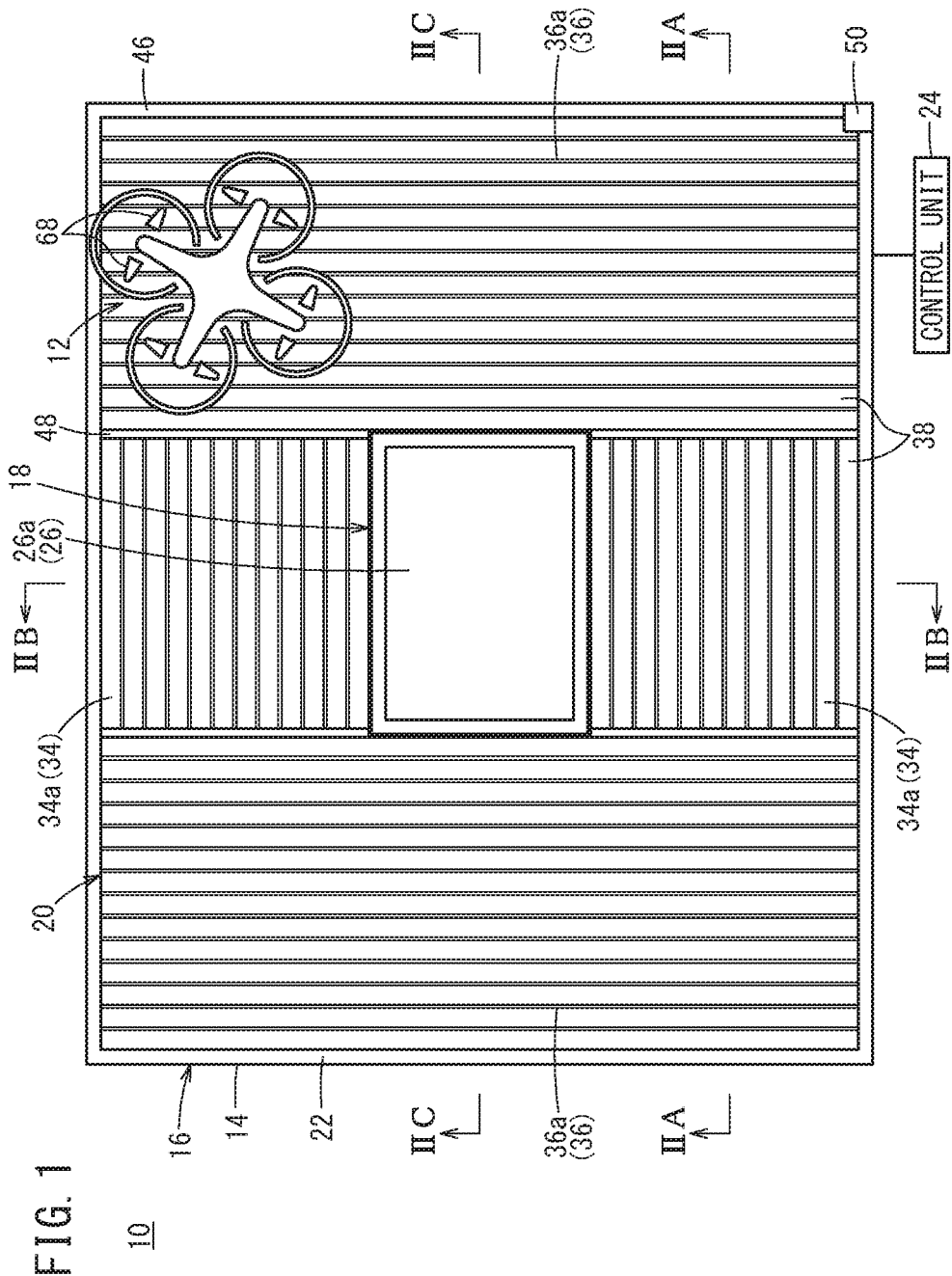
FIG. 1 is a plan view schematically showing a charging apparatus according to one embodiment of the present invention.

As shown in FIG. 1, a charging apparatus 10 according to one embodiment of the present invention is an apparatus which has a landing section 14 enabling an unmanned aerial vehicle 12 (hereafter referred to as drone 12) being in operation such as flight or the like to land and which performs charging of the drone 12 after the landing on the landing section 14.

The charging apparatus 10 is equipped with a main body unit 16 having the aforementioned landing section 14, and a moving unit (not shown) for moving the main body unit 16. The moving unit has a driving source such as an engine, a motor or the like and rolling bodies such as wheels, crawlers or the like which roll by receiving the driving power of the driving source. For example, the moving unit makes the whole of the charging apparatus 10 travel autonomously under the control of a moving control unit (not shown). Alternatively, the charging apparatus 10 may be configured to travel under manipulation by a user, instead of traveling autonomously. Alternatively, the charging apparatus 10 may be a stationary type which does not travel (configured by the main body unit 16 only), or may be mounted on a vehicle (not shown) or the like and moved by operation by a user or by autonomous traveling of the vehicle.

The main body unit 16 of the charging apparatus 10 is fixed to a top portion of the moving unit in such a way that the landing section 14 faces upward in the vertical direction. The charging apparatus 10 has a charging section 18 which performs charging of the drone 12, a conveyor group 20 for conveying the drone 12 to the charging section 18, a frame body 22 for accommodating the charging section 18 and the conveyor group 20, and a control unit 24 configured to control the operations of the charging section 18 and the conveyor group 20.

In the plan view shown in FIG. 1, the charging section 18 is disposed at a center position in the horizontal direction of the frame body 22 and is surrounded by the conveyor group 20. This charging section 18 has a base 26 secured to the frame body 22, and the base 26 extends in the horizontal direction in sectional side view (refer also to FIG. 2B). The upper surface of the base 26 is formed as a flat mounting surface 26a on which the drone 12 can land directly and on which the drone 12 conveyed by the conveyor group 20 can be mounted. The mounting surface 26a is formed in a rectangular shape in plan view.

The base 26 of the charging section 18 is electrically connected to a power supply unit 28 (refer to FIG. 3) such as a large-capacity battery, a generator or the like provided inside the main body unit 16, and performs contact charging or non-contact charging on the drone 12 mounted on the mounting surface 26a. Incidentally, the charging apparatus 10 may be connected to an external power supply, and the external power supply may constitute a part of the power supply unit 28. In this case, a converter unit (not shown) for converting the power standard of the external power supply into a power standard under which the drone 12 can be charged is provided inside the charging apparatus 10 as the other part of the power supply unit 28.

As a system for performing contact charging on the drone 12 from the mounting surface 26a of the charging section 18, there is exemplified a system in which a plurality of conductive tiles (not shown) are arrayed in a grid pattern to constitute the mounting surface 26a, while contact shoes 30 (refer to FIG. 4) contactable with the conductive tiles are provided at leg portions of the drone 12. The contact shoes 30 of the drone 12 have a first contact and a second contact (neither of which is shown) which are contactable with different conductive tiles after the mounting of the drone 12 on the landing section 14. The contact shoes 30 may be configured to be stored inside of, or in the side of, the leg portions when charging is not performed, but to be moved toward the mounting surface 26a to bring the first and second contacts into contact with the respective conductive tiles when flight is terminated or when operated by a user. Thus, the charging of a battery 76 of the drone 12 is performed from the mounting surface 26a (conductive tiles) through the first contact and the second contact.

Further, for another system for performing non-contact charging on the drone 12 from the mounting surface 26a, there is exemplified a system in which the mounting surface 26a is provided with a charging-apparatus-side coil (not shown) at a predetermined position, while the drone 12 is provided with a drone-side coil (not shown) that reacts to the magnetic force of the charging-apparatus-side coil. That is, the charging apparatus 10 converts the electricity of the power supply unit 28 into alternating current to generate an induced electromotive force on the charging-apparatus-side coil and makes electromagnetic induction occur on the drone-side coil. Thus, the energy generated on the drone-side coil is charged into the battery 76 of the drone 12. Incidentally, a configuration using a contact charging system will be exemplified in the following description.

Further, as shown in FIG. 3, the charging section 18 has a current sensor 32 configured to detect electric current supplied from the power supply unit 28 for the charging of the drone 12. The current sensor 32 transmits information on a detected current value to the control unit 24 of the charging apparatus 10.

Referring back to FIG. 1, at the periphery of the charging section 18, the conveyor group 20 configure the landing section 14 enabling the drone 12 to land, together with the mounting surface 26a of the charging section 18. The conveyor group 20 includes first conveyor sections 34 and second conveyor sections 36. That is, by having the charging section 18, the first conveyor sections 34 and the second conveyor sections 36 which are combined to be juxtaposed, the landing section 14 is formed in a square shape in plan view with a sufficient area to allow the drone 12 to land. Thus, the charging apparatus 10 makes it possible for the drone 12 to easily land on the landing section 14 even when an unstable (low accuracy) landing is tried from the flight state.

The first conveyor sections 34 are portions arranged at positions adjacent to the charging section 18 and constituting areas which convey (move) the drone 12 in a first direction toward the charging section 18. On the other hand, the second conveyor sections 36 are portions arranged at positions adjacent to the first conveyor sections 34 and constituting areas which convey (move) the drone 12 in a second direction orthogonal to the first direction.

Further, in the present embodiment, in each area of the first and second conveyor sections 34, 36, a plurality of rollers 38 are arranged in the direction of conveyance to form a conveyor surface (a first conveyor surface 34a or a second conveyor surface 36a) enabling the drone 12 to land. Then, through the rotation of one or more rollers 38, the first and second conveyor sections 34, 36 convey the drone 12 having landed on the conveyor group 20. Incidentally, the configuration for conveying the drone 12 is not limited to the plurality of rollers 38, and may take a configuration in which an endless belt is wound around a plurality of rollers to be moved by the rotation of the rollers.

The first conveyor sections 34 are provided as one pair with the charging section 18 placed therebetween. In the pair of first conveyor sections 34, the rollers 38 are respectively rotated in a direction toward the charging section 18. That is, the "first direction" in the present embodiment designates a direction which directs the drone 12 toward only the charging section 18 in the conveyor group 20 and is not limited to one direction. For example, in the first conveyor sections 34, both of upward and downward directions in FIG. 1 are defined as the first direction.

The axial length of the plurality of rollers 38 constituting the first conveyor sections 34 are set roughly the same as the width of the mounting surface 26a of the charging section 18, and their axes are axially supported by inner frames 48 of the frame body 22. The rollers 38 located on the sides closest to the charging section 18 side in the first conveyor sections 34 are each provided at a position which is sufficiently close to the mounting surface 26a though not in contact with the mounting surface 26a.

The rollers 38 constituting the driving portion of the first conveyor sections 34 are connected to a first motor 40 (refer to FIG. 3) through a first driving transmission mechanism (not shown) composed of a plurality of gears, so that the rotation driving, rotation stop and rotational speed adjustment are performed by the first motor 40.

On the other hand, the second conveyor sections 36 are arranged at positions each adjacent to both of the charging section 18 and the first conveyor sections 34. Further, in the present embodiment, the second conveyor sections 36 are provided as one pair with the charging section 18 and the first conveyor sections 34 placed therebetween.

The pair of second conveyor sections 36 rotate the plurality of rollers 38 in a direction perpendicular to the first direction of the first conveyor sections 34. That is, the "second direction" in the present embodiment designates a direction in which the drone 12 is moved toward the first conveyor sections 34 in the conveyor group 20 and which is not limited to one direction similarly to the first direction. For example, in the second conveyor sections 36, both of rightward and leftward directions in FIG. 1 are defined as the second direction. Furthermore, in the present embodiment, the second conveyor sections 36 are configured not only to make the drone 12 go toward the first conveyor sections 34 but also to enable the drone 12 to move directly to the charging section 18.

The conveyor group 20 not only have the first conveyor sections 34 but also have the second conveyor sections 36 and thus, define a larger area as the landing section 14 for the drone 12 to land. In particular, with the first conveyor section 34 alone, it is difficult to form a shape (near square) which is easy for the drone 12 to land, without enlarging the charging section 18. However, by the provision of the second conveyor sections 36, the charging apparatus 10 is able to configure the landing section 14 of the shape easy for the drone 12 to land.

The axial length of the plurality of rollers 38 constituting the second conveyor sections 36 are roughly in agreement with the width (the sum of widths) of the mounting surface 26a of the charging section 18 and the pair of first conveyor surfaces 34a adjoining each other. In short, the axial length of the rollers 38 in the second conveyor sections 36 is longer than the axial length of the rollers 38 in the first conveyor sections 34. The rollers 38 located on the sides closest to the charging section 18 and the first conveyor sections 34 sides in the second conveyor sections 36 are each provided at a position which is sufficiently close to the mounting surface 26a and the first conveyor surfaces 34a though not in contact with the mounting surface 26a and the first conveyor surfaces 34a. Incidentally, in this embodiment, the rollers 38 in the first conveyor sections 34 and the rollers 38 in the second conveyor sections 36 are set to be mutually the same in thickness (in diameter). This reduces manufacturing costs. Incidentally, the rollers 38 may differ in thickness.

The rollers 38 constituting the driving portion of the second conveyor sections 36 are connected to a second motor 42 (refer to FIG. 3) through a second driving transmission mechanism (a gear mechanism or the like, not shown), so that the rotation driving, rotation stop and rotational speed adjustment are performed by the second motor 42.

Further, in the present embodiment, the mounting surface 26a of the charging section 18, the first conveyor surfaces 34a of the first conveyor sections 34 and the second conveyor surfaces 36a of the second conveyor sections 36 are set to mutually differ in height. Specifically, as shown in FIGS. 2A to 2C, assuming that symbols TH, CH1 and CH2 respectively indicate the height position of the mounting surface 26a, the height position of the first conveyor surfaces 34a and the height position of the second conveyor surfaces 36a from a bottom portion 44 of the fame body 22, there exists a relationship of TH<CH1<CH2.

In particular, the first conveyor surfaces 34a of the first conveyor sections 34 (the top ends of the rollers 38 in the first conveyor sections 34) are located at the same height as the axes of the rollers 38 in the second conveyor sections 36. In other words, the first conveyor surfaces 34a and the second conveyor surfaces 36a (the top ends of the rollers 38 in the second conveyor sections 36) are offset by the radius of the rollers 38. Likewise, the mounting surface 26a of the charging section 18 is located at the same height as the axes of the rollers 38 in the first conveyor sections 34. Accordingly, the second conveyor surfaces 36a of the second conveyor sections 36 differ in height from the mounting surface 26a of the charging section 18 by the diameter of the rollers 38.

The frame body 22 of the charging apparatus 10 has the bottom portion 44 spreading in the horizontal direction, side portions 46 protruding upward from the four-side peripheral edges of the bottom portion 44, and the inner frames 48 supporting the rollers 38 of the first conveyor sections 34. The charging section 18 and the conveyor group 20 are accommodated inside the four side portions 46. Protruding ends of the side portions 46 protrude higher than the conveyor group 20 (the second conveyor sections 36). Therefore, the side portions 46 function as fall prevention guides for preventing the drone 12 from falling outside the landing section 14.

Further, it is preferable that the charging apparatus 10 have an attitude adjustment mechanism (not shown) configured to adjust the horizontal state of the frame body 22 (namely, the charging section 18 and the conveyor group 20) at a site to which the charging apparatus 10 is moved by the moving unit. For example, it is preferable for the attitude adjustment mechanism to have a gyrosensor for detecting the inclination of the body frame 22 and an actuator for automatically adjusting the attitude based on a detection signal from the gyrosensor. Thus, when landing the drone 12, it is possible to always horizontalize the mounting surface 26a of the charging section 18 and the respective conveyor surfaces 34a, 36a of the conveyor group 20 and hence, to land the drone 12 further stably.

As shown in FIGS. 1 and 3, the control unit 24 of the charging apparatus 10 is configured as a computer (controller) having a processor, memories and input and output interfaces (not shown) and controls the operations of the conveyor group 20. The charging apparatus 10 further has a detection unit 50 configured to detect landing of the drone 12 on the landing section 14 of the main body unit 16. The control unit 24 controls the operations of the conveyor group 20 based on detection information from the detection unit 50.

The detection unit 50 is secured to the frame body 22 or the like in such a state of facing the surface direction (horizontal direction) of the landing section 14 and detects the landing of the drone 12 on the landing section 14. Detection means for the drone 12 by the detection unit 50 is not limited particularly. Image recognition by a camera, infrared recognition by infrared sensors or the like may be exemplified as the detection means.

When having determined the presence of the drone 12 based on detection information of the detection unit 50, the control unit 24 outputs driving signals (e.g. pulse signals including information on rotational speeds) to the respective drivers of the first and second motors 40, 42 to rotate the first and second motors 40, 42 independently. Incidentally, the control unit 24 may mutually differently control the moving speed of the first conveyor sections 34 (i.e., the rotational speed of the first motor 40) and the moving speed of the second conveyor sections 36 (i.e., the rotational speed of the second motor 42).

An operating method by the control unit 24 for the first and second conveyor sections 34, 36 is not limited in particular, and may be exemplified as a method for operating the second conveyor sections 36 first and the first conveyor sections 34 subsequently, as will be described later. In this case, in the case where the control unit 24 is configured to operate the first conveyor sections 34 after stopping the operations of the second conveyor sections 36 (that is, to stop the operations of the first or second conveyor sections 34, 36 while operating the remaining conveyor sections), it is possible to convey the drone 12 stably. Alternatively, the control unit 24 may take a configuration in which the operations of the first conveyor sections 34 are started before the stop of operation of the second conveyor sections 36. Further, the control unit 24 may be configured to operate the first and second conveyor sections 34, 36 simultaneously in response to detection of the drone 12.

After the operations of the conveyor group 20, the control unit 24 starts charging of the drone 12 having been placed on the mounting surface 26a of the charging section 18. At this time, the control unit 24 acquires a current value from the current sensor 32 of the charging section 18 and adjusts the electric energy to be supplied from the power supply unit 28 to the charging section 18. Furthermore, it is preferable that the control unit 24 take a configuration to acquire a charged capacity of the battery 76 of the drone 12 and to determine whether to execute a charging or not, based on the charged capacity.

Further, the charging apparatus 10 may include a detector (not shown) for detecting mounting (including landing) of the drone 12 on the mounting surface 26a, and configured to start charging of the drone 12 in response to detection of the drone 12 by the detector. For example, as the detector, there is exemplified a weight sensor or the like for detecting the weight of the drone 12.

Figure 4:
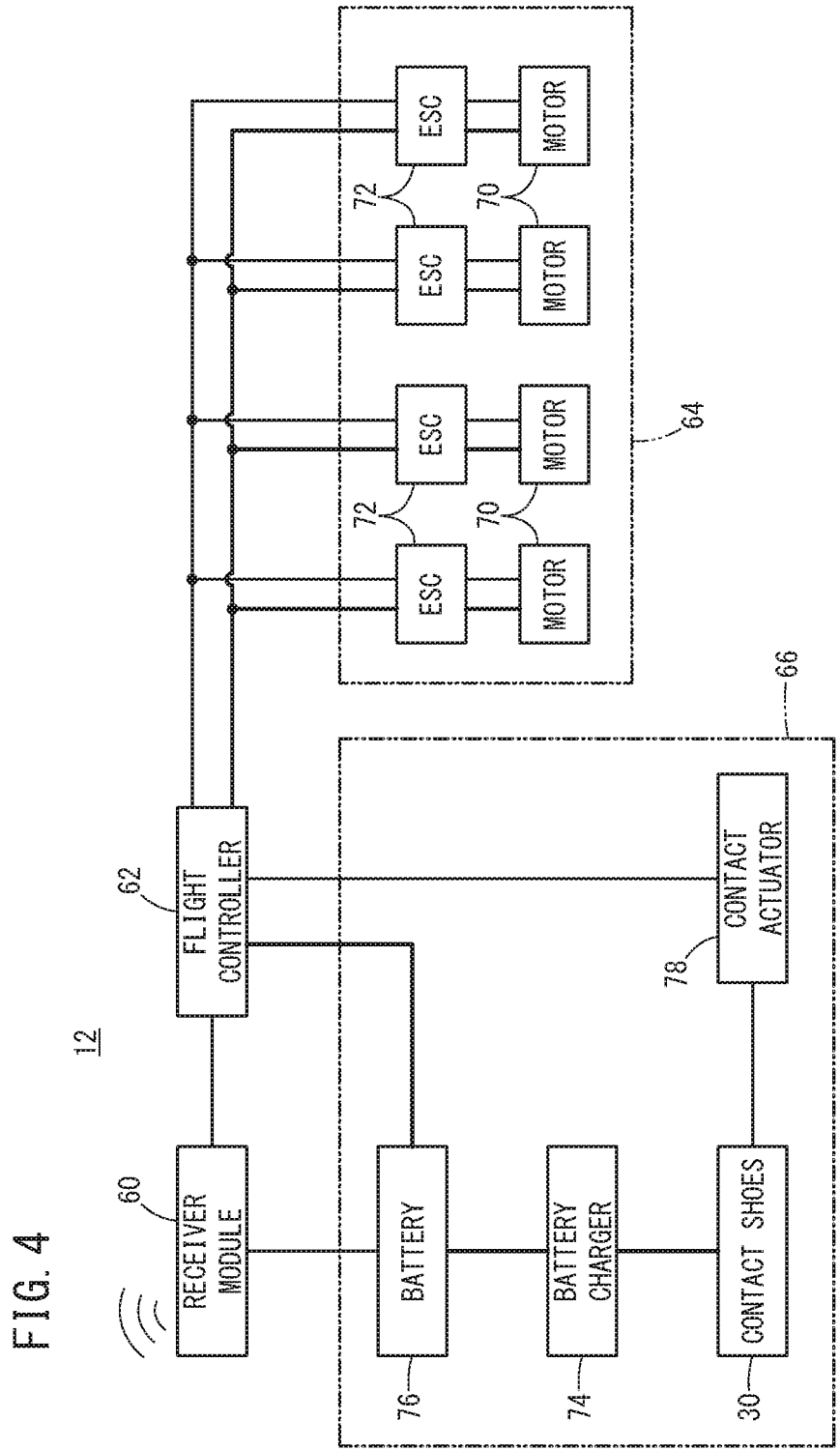
FIG. 4 is a block diagram showing a configuration of an unmanned aerial vehicle.

On the other hand, as shown in FIG. 4, the drone 12 which is applied to the charging apparatus 10 according to the present embodiment has a receiver module 60, a flight controller 62, a propeller driving mechanism 64, a charged unit 66 and the like. For example, the propeller driving mechanism 64 has four propellers 68 (refer to FIG. 1), four motors 70 for rotating the respective propellers 68 independently, and four ESCs 72 respectively connected to the motors 70 to adjust the rotational speeds of the motors 70 under commands from the flight controller 62.

The flight controller 62 calculates the rotational states of the respective propellers 68 based on user-operation information received by the receiver module 60. Then, based on the calculated rotational states, the flight controller 62 outputs rotational speed commands for the respective motors 70 through the respective ESCs 72 and distributes electric power of the battery 76. In FIG. 4, the wiring indicated by bold lines represents an electric power system within the drone 12. Thus, it is possible for the propeller driving mechanism 64 to rotate each propeller 68 at a suitable rotational speed in a suitable rotational direction in accordance with the user's operation and hence, to realize the flight of the drone 12.

Further, the charged unit 66 of the drone 12 has the contact shoes 30, a battery charger 74 and the battery 76. As mentioned earlier, the contact shoes 30 are provided at the leg portions of the drone 12 and contact the first and second contacts with the conductive tiles on the mounting surface 26a when the drone 12 is mounted on the mounting surface 26a. Incidentally, in the configuration that the contact shoes 30 are driven from the stored state to be brought into contact with the mounting surface 26a, there may be taken a configuration that when the drone 12 is mounted on the mounting surface 26a, the flight controller 62 drives a contact actuator 78 to bring the contact shoes 30 into contact with the conductive tiles.

The charging apparatus 10 according to the present embodiment is basically configured as described above, and the operation of the drone 12 at the landing time will be described hereafter.

While the drone 12 is in use, the charging apparatus 10 is disposed at a desired location by the user and is started (is supplied with electric power). At the same time as the starting of the charging apparatus 10, the detection unit 50 observes landing of the drone 12 on the lading section 14 (step S10). On the other hand, the control unit 24 of the charging apparatus 10 receives an output signal (detection information) from the detection unit 50 and determines whether or not the drone 12 has landed on the landing section 14 (step S11). Then, if a landing of the drone 12 is not determined (step S11: NO), the routine is returned to step S10 to repeat the same processing.

Figure 6A:
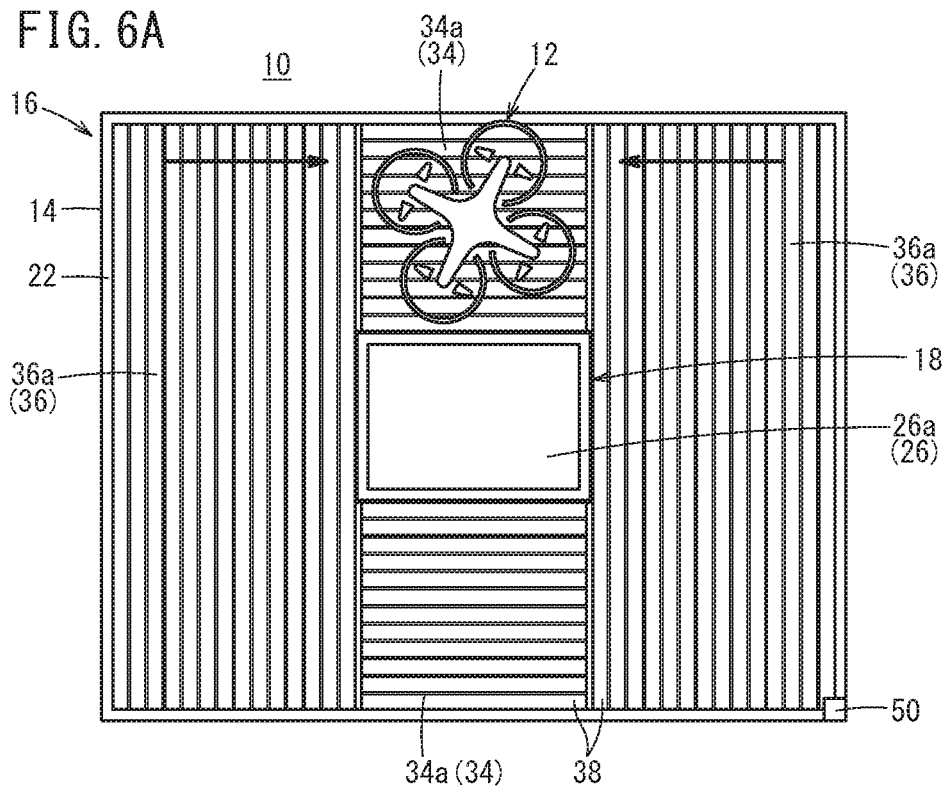
FIG. 6A is a first plan view illustrating the conveyance of the unmanned aerial vehicle landed on a second conveyor section of the charging apparatus.

Then, if a lading of the drone 12 is determined (step S11: YES), the second conveyor sections 36 are operated (step S12). The control unit 24 rotates the second motor 42 at a predetermined rotational speed to rotate the respective rollers 38 in the second conveyor sections 36. Thus, as shown in FIG. 6A, the drone 12 in the case of having landed on either of the second conveyor surfaces 36a is moved in the second direction (toward the inside in the width direction of the landing section 14).

Turning back to FIG. 5, the control unit 24 measures the period of time subsequent to the start of driving of the second conveyor sections 36 by the use of an internal timer unit 24a and determines whether a predetermined period of time has elapsed or not (step S13). This predetermined period of time is a time interval that is long enough to move the drone 12 to the mounting surface 26a even if the drone 12 resides on either of the second conveyor sections 36 at a position furthest from the first conveyor sections 34. Then, if the measurement of the timer unit 24a has not reached the predetermined period of time (step S13: NO), the routine is returned to step S12 to repeat the same processing.

Figure 6B:
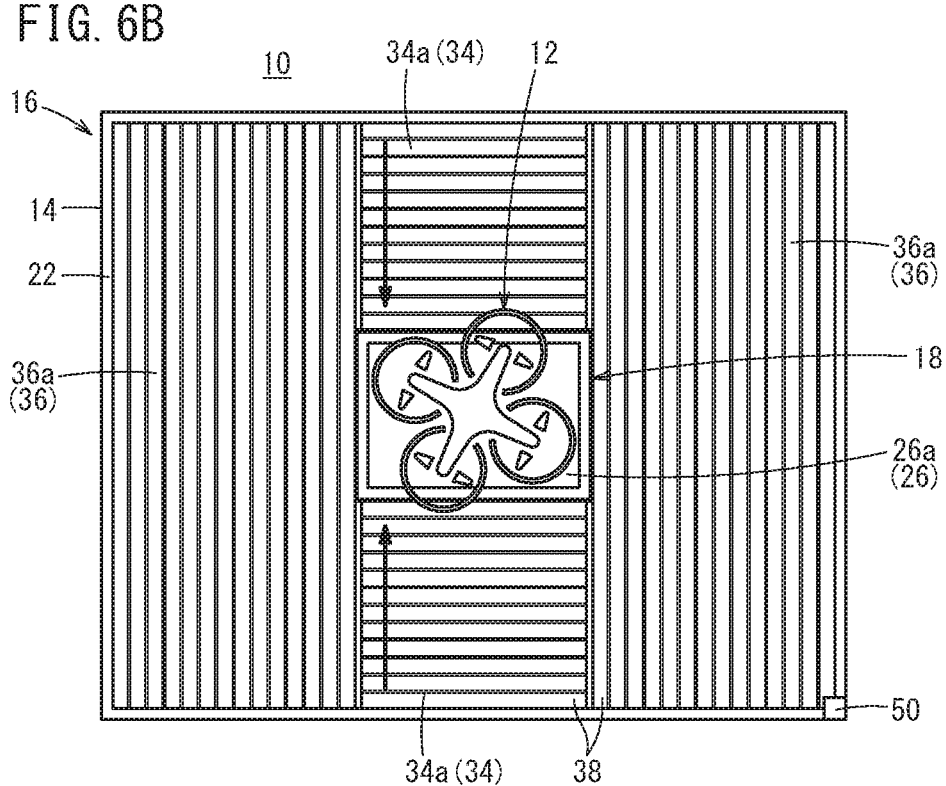
FIG. 6B is a second plan view illustrating the conveyance of the unmanned aerial vehicle conveyed to or landed on a first conveyor section of the charging apparatus.

If the predetermined period of time has been reached (step S13: YES), the control unit 24 stops the operations of the second conveyor sections 36 (step S14). Then, the control unit 24 operates the first conveyor sections 34 (step S15). Specifically, the control unit 24 rotates the first motor 40 at a predetermined rotational speed to rotate the respective rollers 38 of the first conveyor sections 34. As a result, as shown in FIG. 6B, the drone 12 in the case of having been conveyed from either of the second conveyor surfaces 36a to either of the first conveyor surfaces 34a, or in the case of having landed on either of the first conveyor surfaces 34a, is moved in the first direction (namely, toward the mounting surface 26a of the charging section 18).

Returning again back to FIG. 5, the control unit 24 measures a period of time subsequent to the start of driving of the first conveyor sections 34 by the internal timer unit 24a and determines whether a predetermined period of time has elapsed or not (step S16). This predetermined period of time is a time interval that is long enough to move the drone 12 to the mounting surface 26a even if the drone 12 resides on either of the first conveyor sections 34 at a position furthest from the charging section 18. Then, if the measurement of the timer unit 24a has not reached that predetermined period of time (step S16: NO), the routine is returned to step S15 to repeat the same processing.

If that predetermined period of time has been reached (step S16: YES), the control unit 24 stops the operations of the first conveyor sections 34 (step S17). This is because the drone 12 is considered to have been conveyed onto the mounting surface 26a. Subsequently, the control unit 24 checks the remaining capacity of the battery 76 of the drone 12 having been conveyed to or having landed directly on the mounting surface 26a (step S18).

Then, if charging is needed on the drone 12 (step S18: YES), the control unit 24 performs charging of the drone 12 by driving the charging section 18 (step S19). The charging of the drone 12 is performed until the state of charge (SOC) of the battery 76 becomes a predetermined rate such as, for example, 100 percent or the like. Upon completion of the charging, the control unit 24 carries out stopping processing (stopping of driving of the charging section 18 or stopping of driving of the whole of the charging apparatus 10) (step S20). On the other hand, if charging of the drone 12 is unnecessary, the control unit 24 executes step S20 by skipping step S19 (i.e., without performing the operation of the charging section 18).

As described above, in the charging apparatus 10 according to the present embodiment, because the first and second conveyor sections 34, 36 are provided in addition to the charging section 18, it is possible to enlarge the area of the landing section 14 for the drone 12 to land on the charging apparatus 10 and to variously form the planar shape of the landing section 14. Thus, it becomes possible to easily land even if the drone 12 has low landing accuracy. Then, the charging apparatus 10 is able to reliably lead the drone 12 to the charging section 18 by conveying the drone 12 having landed on either of the second conveyor sections 36 in the second direction and by conveying the drone 12 having been conveyed to or having landed on either of the first conveyor sections 34 in the first direction. In addition, because the first and second conveyor sections 34, 36 can be installed at low cost, it is possible to reduce manufacturing costs.

In this case, in the charging apparatus 10, because the second conveyor sections 36 are also arranged at positions adjacent to the charging section 18, it is possible to form the landing section 14 including the charging section 18 in a shape (for example, square) which is easy for the drone 12 to land.

Particularly, the charging apparatus 10 places the charging section 18 between the pair of first conveyor sections 34 and between the pair of second conveyor sections 36 and thus, is able to shorten the conveyance distance of the drone 12. Accordingly, it is possible to start the charging of the drone 12 at an early stage subsequent to its landing.

Then, in the charging apparatus 10, because the charging section 18 is placed at a lower position than the first conveyor sections 34, it is possible to easily move the drone 12 to the charging section 18 by preventing the drone 12 from falling down or the like when, for example, the drone 12 is moved by either of the first conveyor sections 34.

Further, in the charging apparatus 10, because the first conveyor sections 34 are provided at a lower position than the second conveyor sections 36, it is possible to easily move the drone 12 to either of the first conveyor sections 34 by preventing the drone 12 from getting caught or the like when the drone 12 is moved by either of the second conveyor sections 36.

Furthermore, in the charging apparatus 10, because the charging section 18 is provided at a lower position than the second conveyor sections 36, it is possible to prevent the drone 12 from getting caught or the like when, for example, the drone 12 is moved directly to the charging section 18 from either of the second conveyor sections 36.

Here, in the charging apparatus 10, because the first and second conveyor sections 34, 36 are operated based on detection of the drone 12 by the detection unit 50, it is possible to land the drone 12 stably and to move the landed drone 12 smoothly. Further, during the flight of the drone 12, it is possible to suppress power consumption caused by the operations of the conveyor group 20.

Still furthermore, in a configuration that while either of the first conveyor sections 34 and the second conveyor sections 36 are in operation, the other conveyor sections are stopped from being operated, it is possible to perform the conveyance by the first conveyor sections 34 after the drone 12 has been moved reliably from either of the second conveyor sections 36 to either of the first conveyor sections 34. Accordingly, it is possible to reduce the possibility that the drone 12 falls down by receiving moving forces from two different directions.

Incidentally, the present invention is not limited to the foregoing embodiment and can be variously modified in accordance with the gist of the present invention. For example, as mentioned before, the control unit 24 may take a configuration which makes the moving speed of the first conveyor sections 34 differ from the moving speed of the second conveyor sections 36. As one example, in the case where the first conveyor sections 34 are moved at higher speed than the second conveyor sections 36, it is possible for the charging apparatus 10 to expedite the conveyance of the drone 12 to the charging section 18. Further, even with a low speed for moving the drone 12 (even without applying a large moving force), the second conveyor sections 36 can move the drone 12 along the axial direction of the rollers 38 of the first conveyor sections 34 without causing the drone 12 to fall down. On the other hand, when the drone 12 is moved at a high speed on the first conveyor sections 34, the first conveyor sections 34 can apply a large moving force so that the drone 12 can move smoothly on the mounting surface 26*a* (i.e., on the conductive tiles).

Further, for example, by the detection unit 50, the charging apparatus 10 may specifically detect where on the landing section 14 the drone 12 has landed. Then, the charging apparatus 10 may be configured to determine in dependence on the detected position which section of the pairs of first and second conveyor sections 34, 36 should be operated selectively and to control the driving of the selected section.

Further, the charging apparatus 10 may take a configuration that the operations of the first and second conveyor sections 34, 36 are manipulated by the user manually and selectively without depending on the control unit 24. Furthermore, in the case where mutual differences in level are large between the charging section 18, the first conveyor sections 34 and the second conveyor sections 36, there may be taken a configuration in which slant guides 52 (refer to the dotted lines in FIG. 2C) are provided for enabling the drone 12 to move stably.

The charging apparatus 10 may have a storage mechanism for storing the drone 12 after the drone 12 has landed on or has been conveyed to the charging section 18. For example, the storage mechanism may be configured to make the charging section 18 movable vertically and to lower the charging section 18 relative to the conveyor group 20.

[Modifications]

Further, the landing section 14 of the charging apparatus 10 may take various planar shapes without being limited to the above-described configuration in which the charging section 18 is placed between the pair of first conveyor sections 34 and between the pair of second conveyor sections 36.

For example, as shown in FIG. 7A, a landing section 14A according to a first modification may be provided with one first conveyor section 34 in a rectangular shape directed toward a charging section 18 and a pair of second conveyor sections 36 disposed on both sides of the charging section 18 and the first conveyor section 34. That is, in the charging apparatus 10, the charging section 18 need not necessarily be placed at a center position of the landing section 14A.

Further, as shown in FIG. 7B, a landing section 14B according to a second modification may be provided with first conveyor sections 34 on four sides of a charging section 18 at a center position and further with second conveyor sections 36 placed adjacent to the first conveyor sections 34. Furthermore, as shown in FIG. 7C, a landing section 14C according to a third modification may be provided with a pair of first conveyor sections 34 with a charging section 18 placed therebetween and one second conveyor section 36 directed toward the charging section 18 and the first conveyor sections 34.

Still furthermore, as shown in FIG. 7D, a landing section 14D according to a fourth modification may be provided with one first conveyor section 34 directed to a charging section 18 which is placed in a corner of the landing section 14D, and one second conveyor section 36 directed toward the charging section 18 and the first conveyor section 34. Yet furthermore, as shown in FIG. 7E, a landing section 14E according to a fifth modification may include a charging section 18 protruding from a conveyor group 20 of a square shape.

Figure 8:
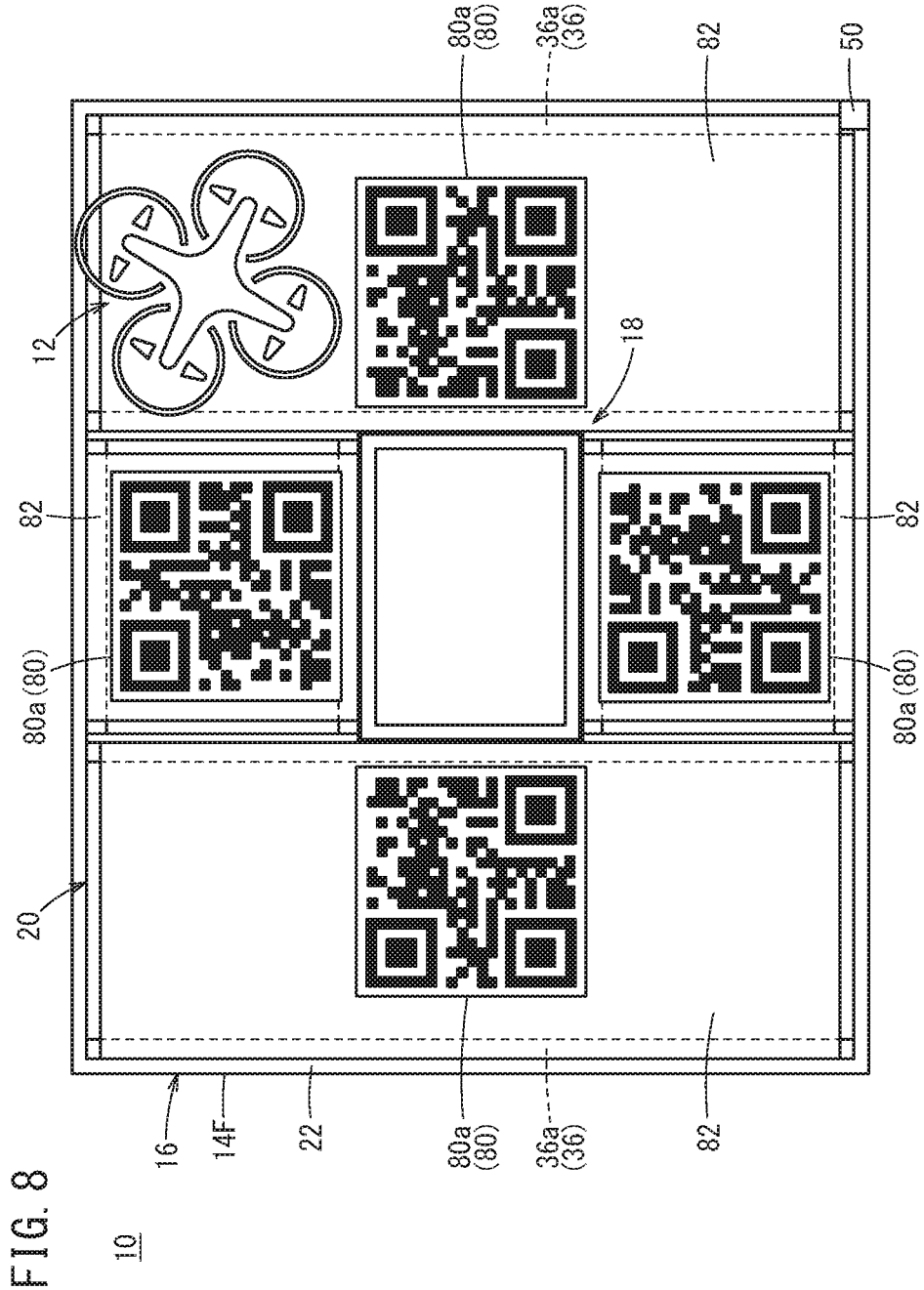
FIG. 8 is a plan view illustrating a configuration of a landing section according to a sixth modification of the present invention.

Further, in a sixth modification shown in FIG. 8, the charging apparatus 10 may be provided at a landing section 14F with notification sections 80 which notify position information for use in landing the drone 12. As one example of the notification sections 80, well-known QR codes (registered trademark) 80*a* may be utilized. For example, the conveyor group 20 have belts 82 wounded around rollers (not shown), in which case the QR codes 80*a* representing the position information of the charging apparatus 10 are printed on the belts 82 in advance. The drone 12 has a camera (not shown) capable of taking an image under the drone 12 itself and acquires the position information by taking and analyzing the images of the QR codes 80*a* at the landing section 14F. With this configuration, it is possible for the drone 12 to autonomously regulate the flight position based on the position information.

Like this, in the charging apparatus 10, because the notification section 80 for notifying the drone 12 of the position information is provided on at least one of the first and second conveyor sections 34, 36, it is possible to further heighten the landing accuracy of the drone 12. In particular, in the case where the notification sections 80 that can be recognized by the drone 12 are configured by printing like the QR codes 80*a*, it is possible to provide position information easily without consuming electric power.

The present invention is not particularly limited to the embodiment described above, and various modifications are possible without departing from the essence and gist of the present invention.

What is claimed is:

1. A charging apparatus comprising:
   a charging section configured to perform charging on an unmanned aerial vehicle;
   a first conveyor section disposed at a position adjacent to the charging section and configured to move the unmanned aerial vehicle in a first direction toward the charging section;
   a second conveyor section disposed at a position adjacent to the first conveyor section and configured to move the unmanned aerial vehicle in a second direction perpendicular to the first direction;

a detection unit configured to detect landing of the unmanned aerial vehicle on the first and second conveyor sections; and a control unit configured to control operations of the first and second conveyor sections based on detection of the unmanned aerial vehicle by the detection unit, wherein the control unit is further configured to make a moving speed of the first conveyor section differ from a moving speed of the second conveyor section.

2. The charging apparatus according to claim 1, wherein:
the second conveyor section is disposed at the position adjacent to the charging section together with the first conveyor section, and is configured to be able to move the unmanned aerial vehicle directly to the charging section through a movement in the second direction.

3. The charging apparatus according to claim 2, wherein:
the first conveyor section includes a pair of the first conveyor sections disposed with the charging section interposed therebetween; and the second conveyor section includes a pair of the second conveyor sections with the charging section and the first conveyor sections interposed therebetween.

4. The charging apparatus according to claim 1, wherein: the charging section is provided at a lower position than the first conveyor section.

5. The charging apparatus according to claim 1, wherein:
the first conveyor section is provided at a lower position than the second conveyor section.

6. The charging apparatus according to claim 1, wherein:
the charging section is provided at a lower position than the second conveyor section.

7. The charging apparatus according to claim 1, wherein:
the control unit is further configured to stop the operation of one of the first and second conveyor sections while operating the other of the first and second conveyor sections.

8. The charging apparatus according to claim 1, wherein:
at least one of the first and second conveyor sections includes a notification section configured to notify the unmanned aerial vehicle of position information of the charging apparatus.

9. The charging apparatus of claim 1, wherein the first conveyor section and the second conveyor section are formed by a plurality of rollers and a belt that is wound around a plurality of rollers.

10. The charging apparatus of claim 1, wherein the control unit is further configured to select the moving speed of the first conveyor section and the second conveyor section, and wherein control unit is configured to select a faster moving speed for the moving speed of the first conveyor section than the moving speed of the second conveyor section.

11. The charging apparatus of claim 1, wherein the control unit is configured to select the moving speed of the first conveyor section and the second conveyor section based on a possibility that the unmanned aerial vehicle will fall from at least one of the first conveyor section or the second conveyor section.

12. The charging apparatus of claim 11, wherein the control unit is configured to select the moving speed of the first conveyor section and the second conveyor section based on a reduction in the likelihood that the unmanned aerial vehicle will fall from at least one of the first conveyor section or the second conveyor section.

* * * * *